US012394932B2

(12) United States Patent
Jung et al.

(10) Patent No.: US 12,394,932 B2
(45) Date of Patent: Aug. 19, 2025

(54) ELECTRICAL CONNECTOR WITH TERMINAL COVER

(71) Applicants: HYUNDAI MOTOR COMPANY, Seoul (KR); KIA CORPORATION, Seoul (KR); Yura Co., Ltd, Hwaseong-si (KR); YURA CORPORATION CO., LTD., Seongnam-si (KR)

(72) Inventors: Yun Jae Jung, Suwon-si (KR); Seung Min Yoo, Hwaseong-si (KR); Byeongkyu Kim, Gwangmyeong-si (KR); Ho Chul Ahn, Bucheon-si (KR); Se Kwun Kim, Seoul (KR)

(73) Assignees: HYUNDAI MOTOR COMPANY, Seoul (KR); KIA CORPORATION, Seoul (KR); Yura Co., Ltd, Hwaseong-si (KR); YURA CORPORATION CO., LTD., Seongnam-si (KR)

( * ) Notice: Subject to any disclaimer, the term of this patent is extended or adjusted under 35 U.S.C. 154(b) by 392 days.

(21) Appl. No.: 17/951,500

(22) Filed: Sep. 23, 2022

(65) Prior Publication Data

US 2023/0094337 A1 Mar. 30, 2023

(30) Foreign Application Priority Data

Sep. 28, 2021 (KR) ........................ 10-2021-0128169

(51) Int. Cl.
*H01R 13/44* (2006.01)
*H01R 13/428* (2006.01)

(52) U.S. Cl.
CPC ........... *H01R 13/44* (2013.01); *H01R 13/428* (2013.01)

(58) Field of Classification Search
CPC .. H01R 13/44; H01R 13/428; H01R 13/6485; H01R 13/5216; H01R 13/641; H01R 13/64; H01R 13/648
USPC .......................................................... 439/135
See application file for complete search history.

(56) References Cited

U.S. PATENT DOCUMENTS

| | | | | |
|---|---|---|---|---|
| 10,320,123 | B1 * | 6/2019 | Sundarakrishnamachari .............. | H01R 13/64 |
| 10,454,199 | B1 * | 10/2019 | Christiano ........... | H01R 13/424 |
| 2017/0025787 | A1 * | 1/2017 | Choi ...................... | H01R 24/76 |
| 2019/0267743 | A1 * | 8/2019 | Nishida .................. | H01R 13/50 |
| 2020/0194938 | A1 * | 6/2020 | Jung .................. | H01R 13/5205 |
| 2021/0135387 | A1 * | 5/2021 | Kobayashi ............. | H01R 13/44 |

* cited by examiner

*Primary Examiner* — Tulsidas C Patel
*Assistant Examiner* — Jeffrey Mountain
(74) *Attorney, Agent, or Firm* — Lempia Summerfield Katz LLC

(57) ABSTRACT

Disclosed is a connector including an outer housing having a tube shape, an inner housing coupled to the inside of the outer housing, the inner housing including a rear wall and a terminal cover formed to extend from the rear wall in a longitudinal direction of the outer housing, and a terminal of a plate shape seated on and coupled to the terminal cover, wherein the terminal cover is provided to cover edges of the terminal of the plate shape and to expose a side surface of the terminal. By this structure, a finger is structurally prevented from coming into contact with the terminal of the connector, and because there are no additional components, a simplification of the structure and a reduction in cost are achieved.

8 Claims, 15 Drawing Sheets

ELECTRICAL CONNECTOR WITH TERMINAL COVER

CROSS-REFERENCE TO RELATED APPLICATION

This application claims priority under 35 U.S.C. § 119 to Korean Patent Application No. 10-2021-0128169, filed on Sep. 28, 2021, in the Korean Intellectual Property Office, the disclosure of which is incorporated by reference herein in its entirety.

TECHNICAL FIELD

The present disclosure relates to a connector capable of structurally preventing a finger from coming into contact with a terminal of a connector.

BACKGROUND

The statements in this section merely provide background information related to the present disclosure and may not constitute prior art.

Connectors for supplying power to an electric vehicle or the like may be configured as one set such that a first connector may be mounted on a device such as an inverter and a motor, and a second connector may be detachably mounted on the first connector in a state in which a power supply cable is connected thereto. Terminals of the first connector and the second connector configured as the one set may generally be provided with a male terminal on one side and a female terminal on the other side.

A connector having the male terminal among these terminals may be provided in a form in which one end of the terminal is accommodated in an open housing, but depending on a size of the opening of the housing and a depth of the terminal disposed therein, safety accidents such as electric shock may occur when a finger of an operator or the like comes into contact with the terminal.

In order to reduce a risk of such a safety accident, it is desired to satisfy a normally required standard specification, for example, the IPXXB standard.

In the prior art, a moving plate is added to a high voltage male connector in order to satisfy the IPXXB standard, but the addition of this component causes an increase in cost and complexity of the structure.

SUMMARY

It is an aspect of the disclosure to provide a connector capable of reducing cost and simplifying the structure without adding new components while satisfying the IPXXB standard.

Additional aspects of the present disclosure are set forth in part in the description which follows and, in part, should be obvious from the description, or may be learned by practice of the disclosure.

In accordance with an aspect of the disclosure, a connector includes: an outer housing having a tube shape; an inner housing coupled to the inside of the outer housing, the inner housing including a rear wall and a terminal cover formed to extend from the rear wall in a longitudinal direction of the outer housing; and a terminal in a plate shape configured to be seated on and coupled to the terminal cover. In particular, the terminal cover covers edges of the terminal and exposes a side surface of the terminal.

The terminal cover may include a first cover provided to cover a front surface of the terminal of the plate shape, and a second cover provided to cover upper and lower surfaces of the terminal of the plate shape.

When the terminal is coupled to the terminal cover, the edges of the terminal and the first and second covers of the terminal cover may have a structure of being engaged with each other.

The connector may further include a lance, wherein when the terminal is coupled to the inner housing, the lance may be coupled to a hole formed on one side of the terminal.

The connector may further include a TPA (Terminal Position Assurance), wherein when the terminal is coupled to the inner housing, the terminal may be fixed using the TPA.

The TPA may include a protrusion and a groove, and the protrusion may be released to separate the TPA when a force is applied to the groove of the TPA.

The connector may further include a protective rib, wherein the protective rib may cover a portion of the side surface of the terminal.

A hole may be formed in a center of the first cover of the terminal cover so that whether the terminal is assembled with the terminal cover may be checked.

In accordance with an aspect of the disclosure, a connector includes: an outer housing having a tube shape; an inner housing coupled to the inside of the outer housing, where the inner housing includes a rear wall and a terminal cover formed to extend from the rear wall in a longitudinal direction of the outer housing; and a terminal formed in a plate shape and configured to be seated on and coupled to the terminal cover. In particular, the terminal cover is configured to cover a portion of edges of the terminal in the plate shape and to expose a side surface of the terminal. In another embodiment, the terminal cover includes at least one of a first cover provided to cover a front surface of the terminal or a second cover provided to cover upper and lower surfaces of the terminal.

When the terminal is coupled to the terminal cover, the front surface of the terminal and the first cover of the terminal cover may have a structure of being engaged with each other.

When the terminal is coupled to the terminal cover, the upper and lower surfaces of the terminal and the second cover of the terminal cover may have a structure of being engaged with each other.

In accordance with an aspect of the disclosure, a connector includes: an outer housing having a tube shape; an inner housing coupled to the inside of the outer housing; wherein the inner housing includes a rear wall and a terminal cover formed to extend from the rear wall in a longitudinal direction of the outer housing; and a terminal formed in a plate shape and configured to be seated on and coupled to the terminal cover, wherein the terminal cover is provided to cover a portion of edges of the terminal of the plate shape and to expose a side surface of the terminal. In particular, the terminal cover includes at least one of a first cover provided to cover a front surface of the terminal of the plate shape or a second cover provided to cover upper and lower surfaces of the terminal of the plate shape. When the terminal is coupled to the terminal cover, the front surface of the terminal and the first cover of the terminal cover have a structure of being engaged with each other, and the upper and lower surfaces of the terminal and the second cover of the terminal cover have a structure of being engaged with each other.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

These and/or other aspects of the disclosure should become apparent and more readily appreciated from the following description of the embodiments, taken in conjunction with the accompanying drawings of which.

The drawings described herein are for illustration purposes only and are not intended to limit the scope of the present disclosure in any way.

DETAILED DESCRIPTION

Configurations shown in the embodiments and the drawings described in the present specification are only the exemplary embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It should be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "upper surface direction," "lower surface direction," and the like used in the following description are defined based on the drawings, and the shape and position of each component are not limited by these terms.

When a component, device, element, or the like of the present disclosure is described as having a purpose or performing an operation, function, or the like, the component, device, or element should be considered herein as being "configured to" meet that purpose or to perform that operation or function.

Hereinafter, an embodiment of a high voltage male connector and a high voltage connector according to some embodiments of the present disclosure are described in detail with reference to the accompanying drawings.

Figure 1:
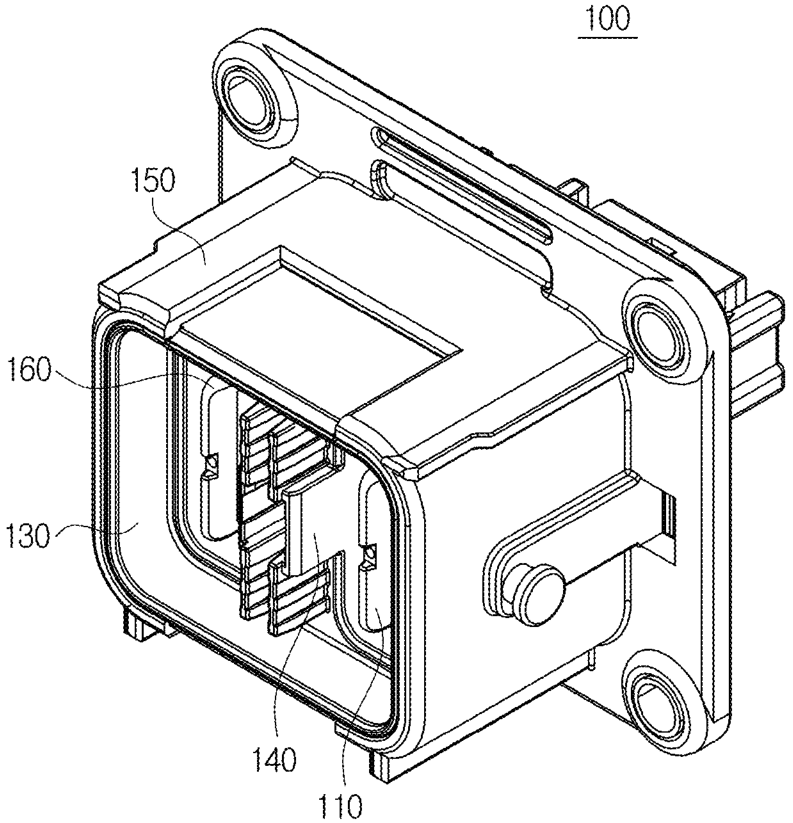
FIG. 1 is a perspective view illustrating an outer appearance of a connector in one embodiment of the present disclosure.
Figure 2:
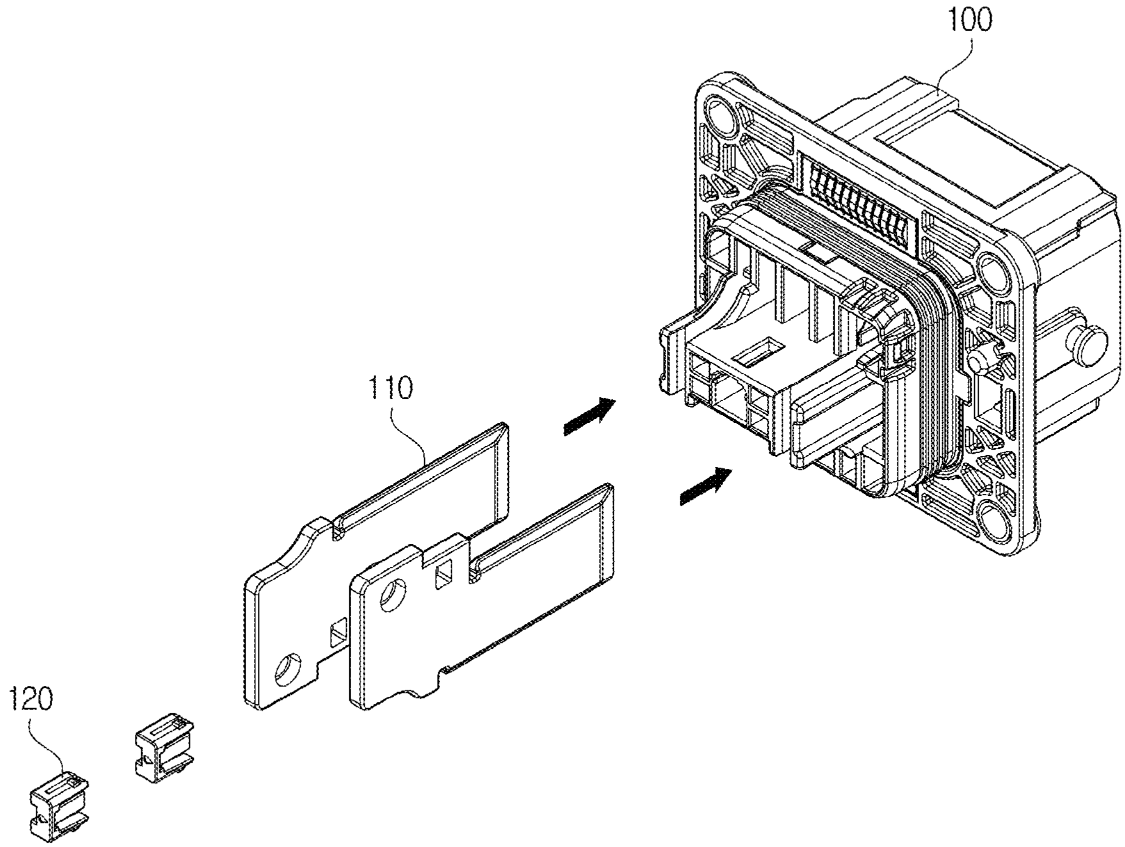
FIG. 2 is an exploded perspective view illustrating a method in which components of the connector are assembled in one embodiment of the present disclosure.

FIG. 1 is a perspective view illustrating an outer appearance of a connector, and FIG. 2 is an exploded perspective view illustrating a method in which components of the connector are assembled.

Connectors may be generally configured as a pair including a first connector mounted on a device side and a second connector, to which a cable or the like is connected, detachably connected to the first connector, and may be classified into a male connector and a female connector depending on the type of a terminal.

The male connector has a male terminal, and the female connector has a female terminal into which the male terminal of the male connector may be inserted.

The connector illustrated in FIG. 1 may be classified as the first connector mounted on a device side or the male connector. A general high voltage connector may have a structure in which an inner housing made of an insulating material such as a resin material is disposed inside an outer housing made of metal for shielding and grounding, and a terminal is inserted into the inner housing.

Referring to FIG. 1, a high voltage male connector 100 according to an embodiment may include an outer housing 150, an inner housing 130, a partition 140, a terminal 110, and a terminal cover 160.

The outer housing 150 may function to form an outer appearance of the connector 100, protect components, and support inner components, and may have a tube shape. The inner housing 130 may be inserted into and mounted in the outer housing 150.

The inner housing 130 may be assembled by being inserted into the outer housing 150 or configured by an insert injection method.

The terminal 110 may be inserted into and mounted in the inner housing 130 so that a front end of the terminal 110 faces the outside.

The connector 100 illustrated in FIG. 1 may include two of the terminals 110 made of a metal material, and each of the terminals 110 may be configured in a plate shape as a terminal for supplying high voltage power.

The partition 140 is formed in the inner housing 130 and may be configured to surround the terminal 110.

The terminal cover 160 may be formed to extend from a rear wall of the inner housing 130 in a longitudinal direction of the outer housing 150. That is, the terminal cover 160 may be configured separately from the inner housing 130 or may be configured to extend from the inner housing 130.

The terminal 110 may be seated on and coupled to the terminal cover 160. In order to seat and couple the terminal 110 of a plate shape, the terminal cover 160 may be formed in a C shape.

The terminal cover 160 may cover an edge of the terminal 110 of a plate shape. In this case, because one side of the terminal 110 is required to be in contact with a terminal 210 of a female connector 200, the one side of the terminal 110 may be formed to be exposed.

Referring to FIG. 2, the terminal 110 is inserted into and assembled to a rear surface of the connector 100, and the assembled terminal 110 may be fixed with a TPA 120. A detailed description of the TPA 120 is described below.

The terminal 110 may be assembled to the rear surface of the connector 100 in order to be seated on and coupled to the terminal cover 160 formed to extend from the rear wall of the inner housing 130 in the longitudinal direction of the outer housing 150.

Figure 3:
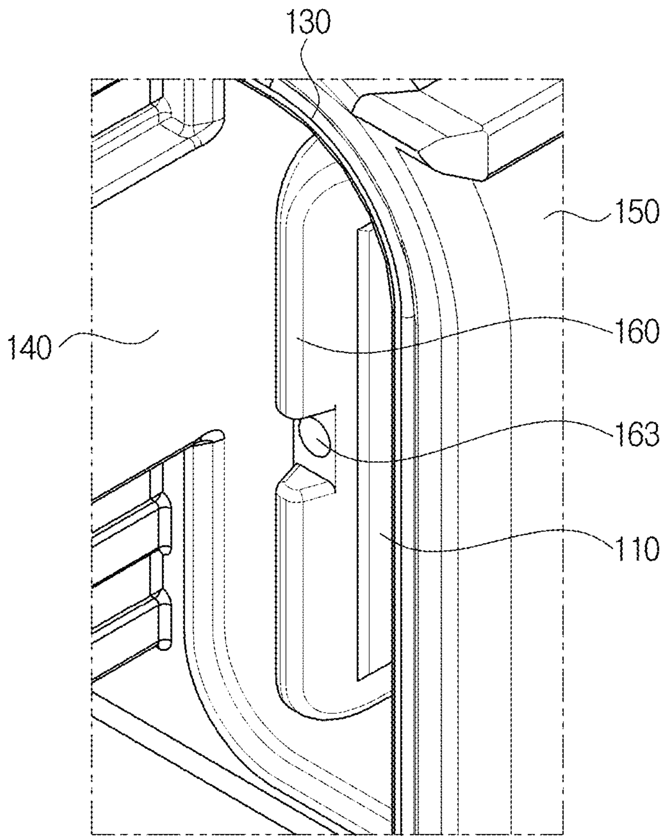
FIG. 3 is a view illustrating an outer appearance of a terminal in one embodiment of the present disclosure.
Figure 4:
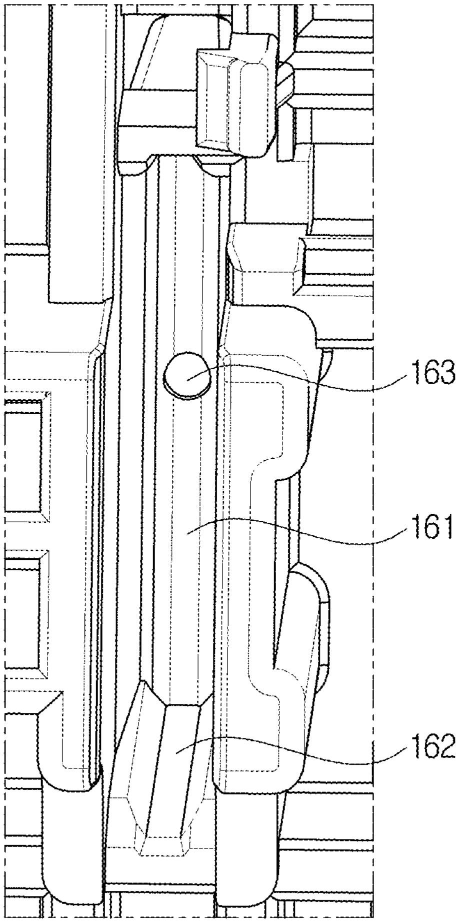
FIG. 4 is a view illustrating a terminal cover on and to which the terminal is seated and coupled in a direction in which the terminal is assembled in one embodiment of the present disclosure.

FIG. 3 is a view illustrating a terminal, and FIG. 4 is a view illustrating a terminal cover on and to which the terminal is seated and coupled in a direction in which the terminal is assembled.

As illustrated in FIG. 3, the terminal 110 may be formed in a rectangular plate shape.

The terminal 110 may include an edge 111 formed on a front surface and edges 112 formed on upper and lower surfaces of the terminal 110. Also, a hole 113 may be provided on one side of the terminal 110. A lance 170 may be inserted into the hole 113 such that the terminal 110 may be fixed to the inner housing 130, and a description thereof is described below.

Referring to FIG. 4, the terminal cover 160 may include a first cover 161 provided to cover the front surface of the terminal 110 and a second cover 162 provided to cover the upper and lower surfaces of the terminal 110.

When the terminal 110 is assembled with the terminal cover 160, the first cover 161 of the terminal cover 160 comes into contact with the edge 111 of the front surface of the terminal 110, and the second cover 162 comes into contact with the edges 112 of the upper and lower surfaces of the terminal 110.

As such, as the edges 111 and 112 of the terminal 110 are covered by the terminal cover 160, a finger may be prevented from coming into contact with the terminal 110.

However, when the terminal cover 160 is simply in a state of being in contact with the terminal 110, deformation and damage of the terminal 110 may occur due to an external impact or the like.

In order to prevent such deformation and damage, the terminal 110 and the terminal cover 160 have a structure in which the terminal 110 and the terminal cover 160 are engaged with each other when the terminal 110 is assembled to the terminal cover 160. Hereinafter, this structure is described with reference to FIGS. 5 and 6.

Figure 5:
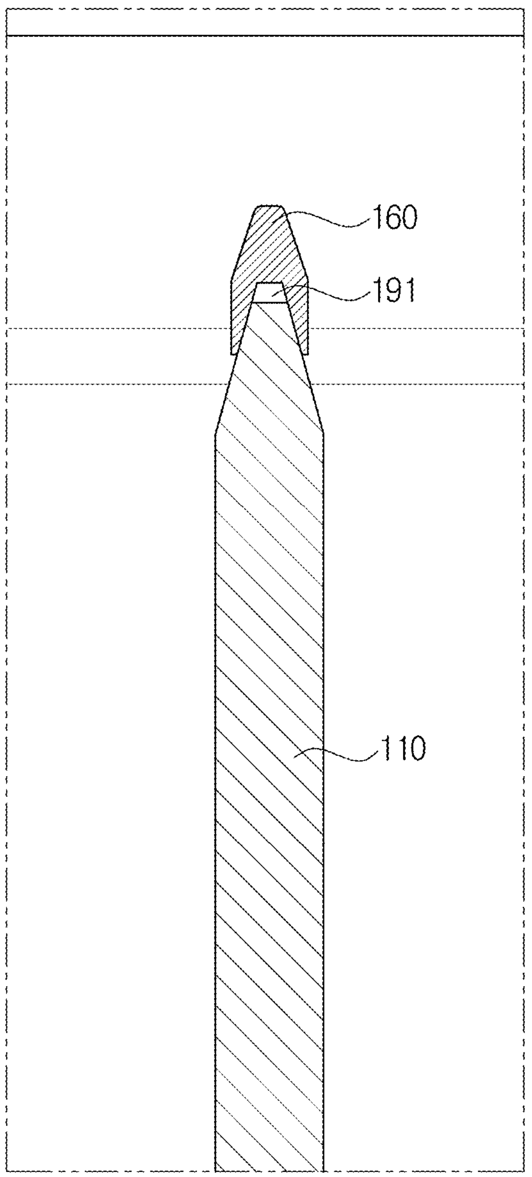
FIG. 5 is a side cross-sectional view illustrating a state in which the terminal and the terminal cover are assembled in one embodiment of the present disclosure.
Figure 6:
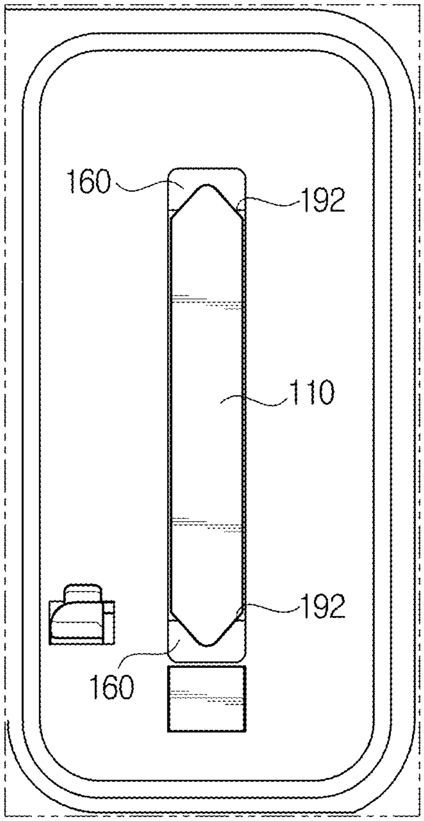
FIG. 6 is a front view illustrating the state in which the terminal and the terminal cover are assembled in one embodiment of the present disclosure.

FIG. 5 is a side cross-sectional view illustrating a state in which the terminal and the terminal cover are assembled, and FIG. 6 is a front view illustrating the state in which the terminal and the terminal cover are assembled.

Referring to FIG. 5, the front surface of the terminal 110 may be covered by the terminal cover 160. In this case, the terminal cover 160 in FIG. 5 may be the first cover 161 covering the front surface of the terminal 110.

As illustrated in FIG. 5, as the first cover 161 of the terminal cover 160 covers the front surface of the terminal 110, a finger may be prevented from coming into contact with the front surface of the terminal 110.

In addition, when the first cover 161 covers the terminal 110, deformation and damage caused by an external impact or the like may be prevented through an engaging structure 191.

Referring to FIG. 6, the upper and lower surfaces of the terminal 110 may be covered by the terminal cover 160. In this case, the terminal cover 160 in FIG. 6 may be the second cover 162 covering the upper and lower surfaces of the terminal 110.

As illustrated in FIG. 6, as the second cover 162 of the terminal cover 160 covers the upper and lower surfaces of the terminal 110, a finger may be prevented from coming into contact with the upper and lower surfaces of the terminal 110.

In addition, when the second cover 162 covers the terminal 110, deformation and damage caused by an external impact or the like may be prevented through an engaging structure 192.

As another embodiment, the terminal cover 160 may include only one of the first cover 161 and the second cover 162.

In other words, only the first cover 161 covering the front surface of the terminal 110 may cover the front surface of the terminal 110 and the second cover 162 may not cover the terminal 110, or only the second cover 162 covering the upper and lower surfaces of the terminal 110 may cover the upper and lower surfaces of the terminal 110 and the first cover 161 may not cover the terminal 110.

When only the first cover 161 covers the terminal 110, as illustrated in FIG. 5, only the front surface of the terminal 110 is covered, so that a finger may not come into contact with the front surface of the terminal 110.

In this case, the first cover 161 and the front surface of the terminal 110 are coupled by being engaged with each other, so that deformation and damage caused by an external impact or the like may be prevented.

When only the second cover 162 covers the terminal 110, as illustrated in FIG. 6, only the upper and lower surfaces of the terminal 110 are covered, so that a finger may not come into contact with the upper and lower surfaces of the terminal 110.

In this case, the second cover 162 and the upper and lower surfaces of the terminal 110 are coupled by being engaged with each other, so that deformation and damage caused by an external impact or the like may be prevented.

As such, the terminal cover 160 covering the terminal 110 may include only one of the first cover 161 and the second cover 162, and may include both the first cover 161 and the second cover 162 as described above.

Figure 7:
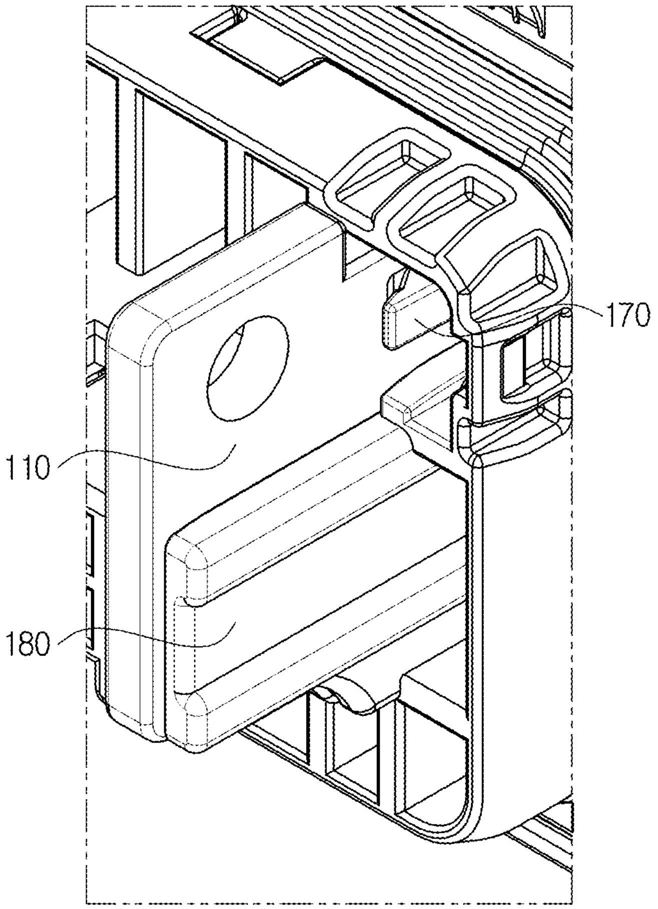
FIG. 7 is a perspective view illustrating the connector in a state in which the terminal is assembled in one embodiment of the present disclosure.

FIG. 7 is a perspective view illustrating the connector in a state in which the terminal is assembled.

Referring to FIG. 7, the connector 100 may include the inner housing 130 coupled to the inside of the outer housing 150 and the terminal cover 160 formed to extend from the rear wall of the inner housing 130 in the longitudinal direction of the outer housing 150, and the terminal cover 160 may cover the terminal 110.

The terminal cover 160 may structurally prevent a finger from coming into contact with the terminal 110 by covering the front, and upper and lower edges of the terminal 110.

The terminal cover 160 may include a hole 163 in a center of the front surface.

The hole 163 has a structure of being formed in the center of the front surface of the terminal cover 160 to allow the inside to be seen, and whether the terminal 110 is securely coupled to the terminal cover 160 may be checked through the hole 163.

Specifically, whether the terminal 110 is securely coupled to the terminal cover 160 may be visually checked through the hole 163, and whether the terminal 110 is completely assembled may be checked from the outside with a contact tester by using the hole 163.

Figure 8:
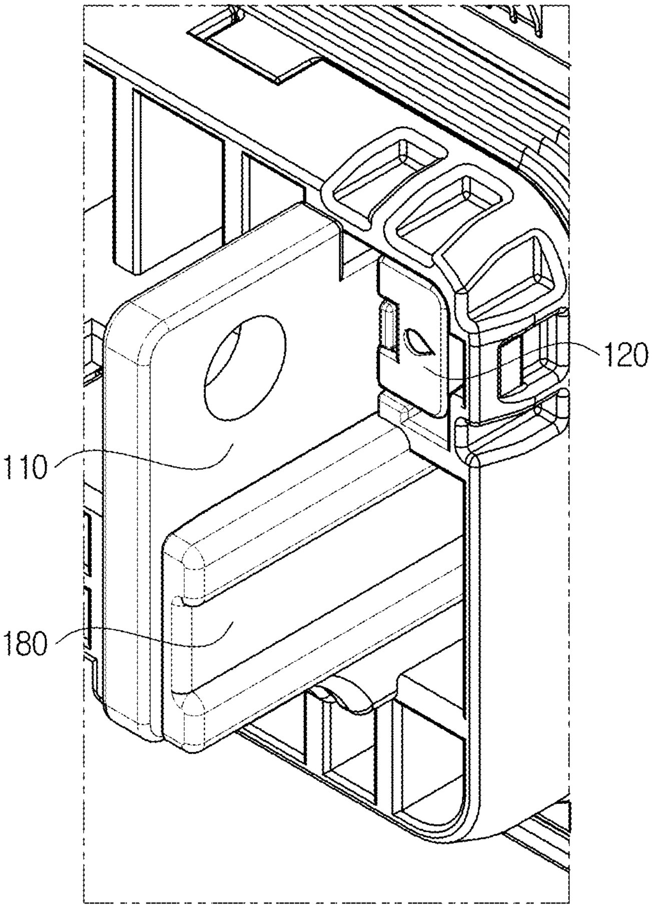
FIG. 8 is a view illustrating a lance and a protective rib for fixing and protecting the terminal when the terminal is assembled in one embodiment of the present disclosure.
Figure 9:
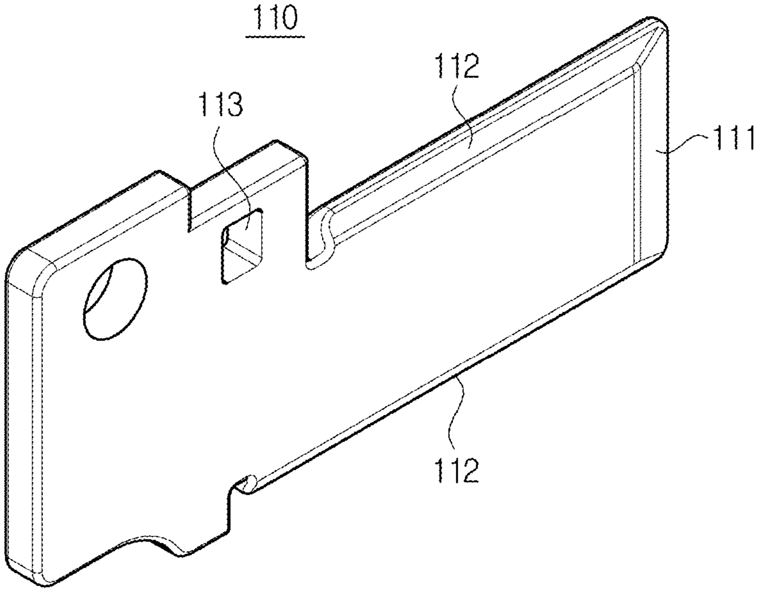
FIG. 9 is a view illustrating a state in which the terminal is secondarily fixed using a TPA when the terminal is assembled in one embodiment of the present disclosure.

FIG. 8 is a view illustrating a lance and a protective rib for fixing and protecting the terminal when the terminal is assembled, and FIG. 9 is a view illustrating a state in which the terminal is secondarily fixed using a TPA when the terminal is assembled.

In a case where a separate fixing device is not provided when the terminal 110 is assembled to the inner housing 130, deformation and damage can be caused by an external impact or the like.

Referring to FIG. 8, in order to inhibit or prevent such deformation and damage, the terminal 110 may be fixed using the lance 170 when the terminal 110 is assembled to the inner housing 130.

As illustrated in FIG. 3, the terminal 110 may be provided with the hole 113 on the one side.

When the terminal 110 is assembled, as the lance 170 is coupled to the hole 113, the terminal 110 may be firmly fixed.

The lance 170 may have an elastically deformable cantilever shape to fix and release the terminal 110.

A protective rib 180 extending in a front-rear direction may be provided on one side of the terminal 110.

The protective rib 180 may serve to prevent deformation and damage by preventing an external force from acting on the terminal 110.

As described above, the terminal 110 may be fixed and protected through the lance 170 and the protective rib 180. In addition, the TPA 120 may be further coupled to secondarily fix the terminal 110, and a description thereof is given below.

Figure 10:
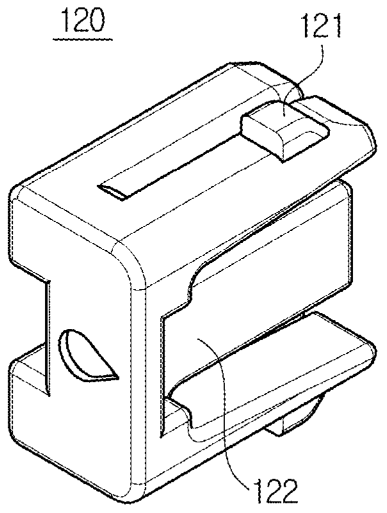
FIG. 10 is a view illustrating an outer appearance of the TPA in one embodiment of the present disclosure.

FIG. 10 is a view illustrating an outer appearance of the TPA.

When a separate fixing device such as the TPA is not provided in a conventional connector, there is a problem that the terminal is pushed back when the female connector and the male connector are combined.

The TPA (Terminal Position Assurance) is a terminal position assurance member, and by regulating a position of the terminal 110 by the TPA 120, the position of the terminal 110 may be accurately secured within the inner housing 130, so that the problem of the terminal being pushed back as described above may be solved.

The TPA 120 may include protrusions 121 and a groove 122.

The protrusions 121 are portions protruding from upper and lower surfaces of the TPA 120, and the groove 122 is a portion recessed from one side surface of the TPA 120.

The protrusions 121 formed on the upper and lower surfaces of the TPA 120 may be caught on the inner housing 130 to prevent the terminal 110 from being separated from the inner housing 130.

When a force is applied by inserting a tool into the groove 122 formed on the side surface of the TPA 120, the protrusions 121 may be released to separate the TPA 120.

Specifically, when a force is applied to the groove 122 of the TPA 120 in a direction opposite to a fastening direction of the TPA 120 and the inner housing 130 using the tool, as the protrusions 121 of the TPA 120 fastened to the inner housing 130 generate elastic deformation, the TPA 120 may be separated.

As such, the terminal 110 may be secondarily fixed through the protrusions 121 of the TPA 120, and the coupling of the TPA 120 may be easily released through the groove 122.

Figure 11:
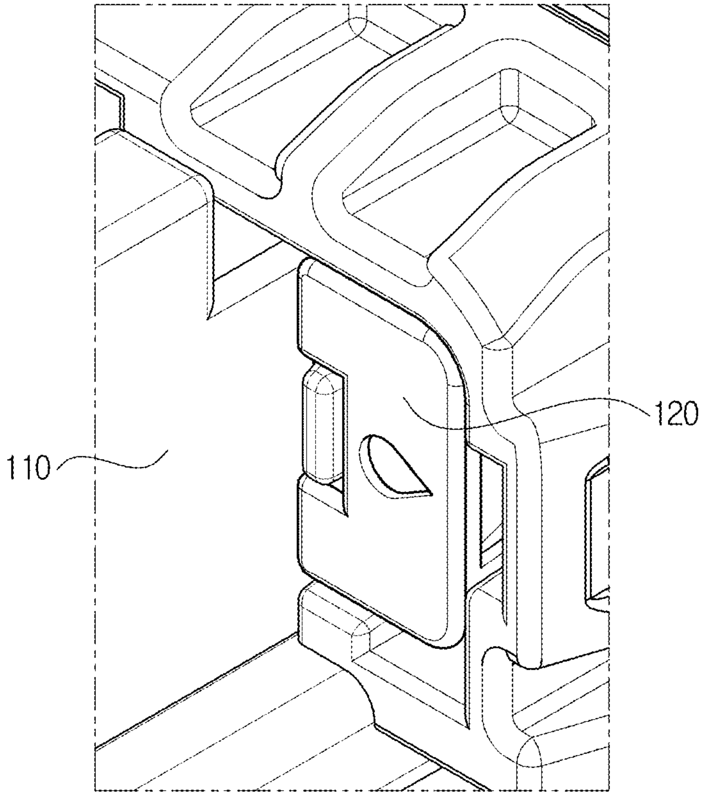
FIG. 11 is a perspective view illustrating a state in which the TPA is assembled in one embodiment of the present disclosure.

FIG. 11 is a perspective view illustrating a state in which the TPA is assembled.

As described above, the terminal 110 may be fixed by the lance 170, and the lance 170 may be fixed by the TPA 120. That is, the terminal 110 may be primarily fixed by the lance 170 and secondarily fixed by the TPA 120.

A separate groove in which the lance 170 is accommodated may be formed on the opposite side of the groove 122 of the TPA 120. When the protrusions 121 of the TPA 120 are coupled to the inner housing 130, the movement of the lance 170 accommodated in the TPA 120 may be restricted, and thus the terminal 110 coupled to the lance 170 may be more firmly fixed.

As a result, the protrusions 121 of the upper and lower surfaces of the TPA 120 may be caught on the inner housing so that the terminal 110 may be fixed. When a force is applied by inserting the tool into the groove 122 of the side surface of the TPA 120, the coupling of the TPA 120 may be released.

As such, the terminal 110 may be more firmly fixed to the inner housing 130 by using the TPA 120, and deformation and damage caused by an external impact or the like may be prevented.

Figure 12B:
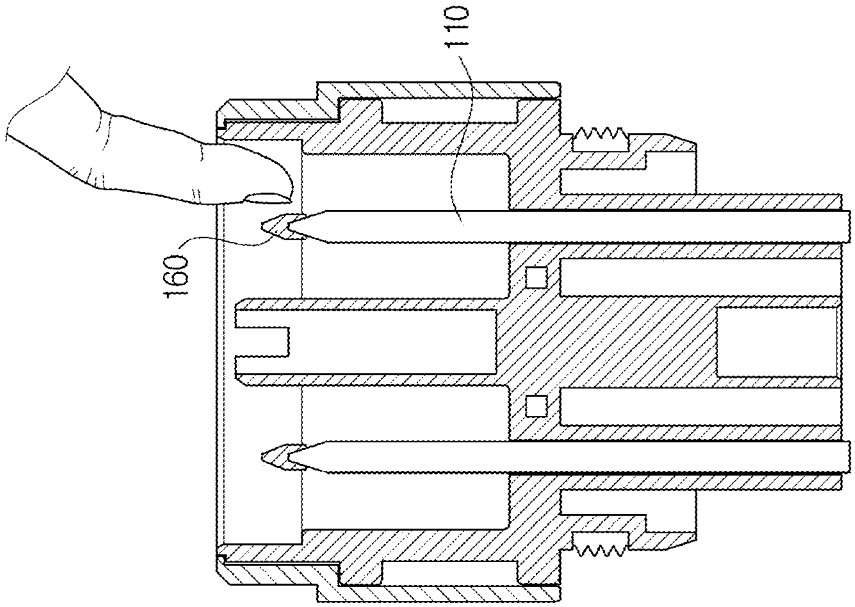
FIGS. 12A and 12B respectively illustrate an upper and lower cross-sectional view depicting a structure of the connector in one embodiment of the present disclosure.
Figure 12A:
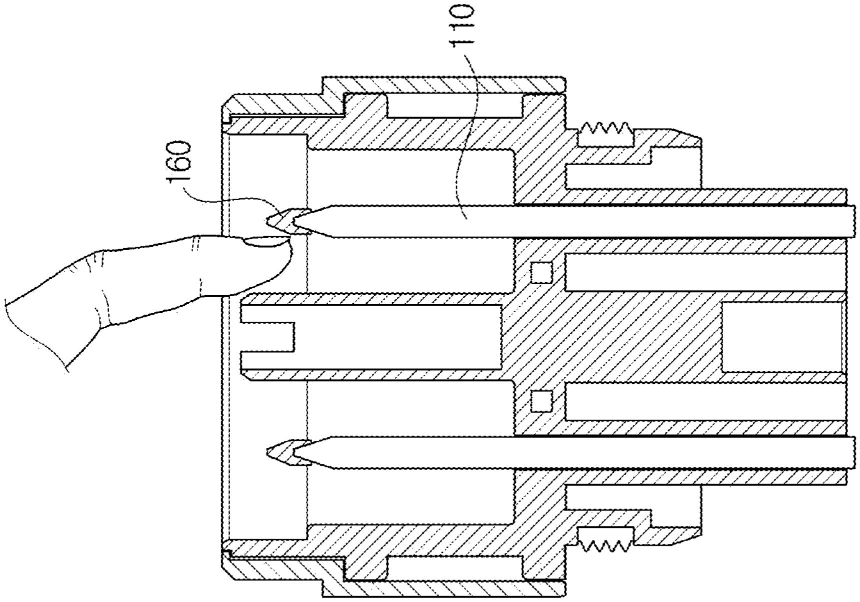
Figure 13:
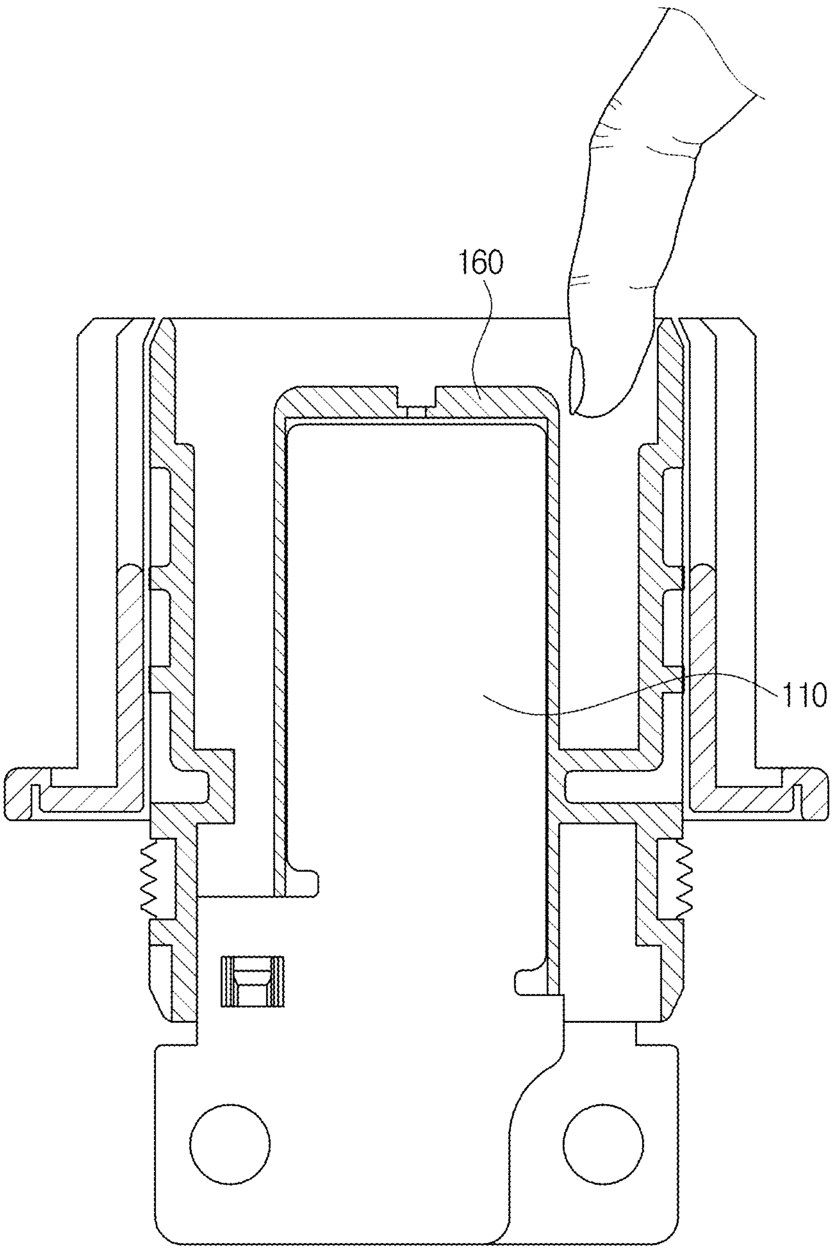
FIG. 13 is a side cross-sectional view illustrating the structure of the connector in one embodiment of the present disclosure.

FIG. 12A is an upper cross-sectional view and FIG. 12B is a lower cross-sectional view, each illustrating a structure of the connector. FIG. 13 is a side cross-sectional view illustrating the structure of the connector.

Referring to FIG. 12, the first cover 161 of the terminal cover 160 surrounds the terminal 110 on the front surface of the terminal 110 of the connector 100.

The first cover 161 and the front surface of the terminal 110 may be coupled to each other with the engaging structure 191 to be firmly fixed.

According to this structural feature, even when a finger is in the vicinity of the front surface of the terminal 110 of the connector 100, the finger may be prevented from coming into contact with the terminal 110 by the first cover 161.

Referring to FIG. 13, the second cover 162 of the terminal cover 160 surrounds the terminal 110 on the upper and lower surfaces of the terminal 110 of the connector 100.

The second cover 162 and the upper and lower surfaces of the terminal 110 may be coupled to each other with the engaging structure 192 to be firmly fixed.

According to this structural feature, even when a finger is in the vicinity of the upper and lower surfaces of the terminal 110 of the connector 100, the finger may be prevented from coming into contact with the terminal 110 by the second cover 162.

Figure 14A:
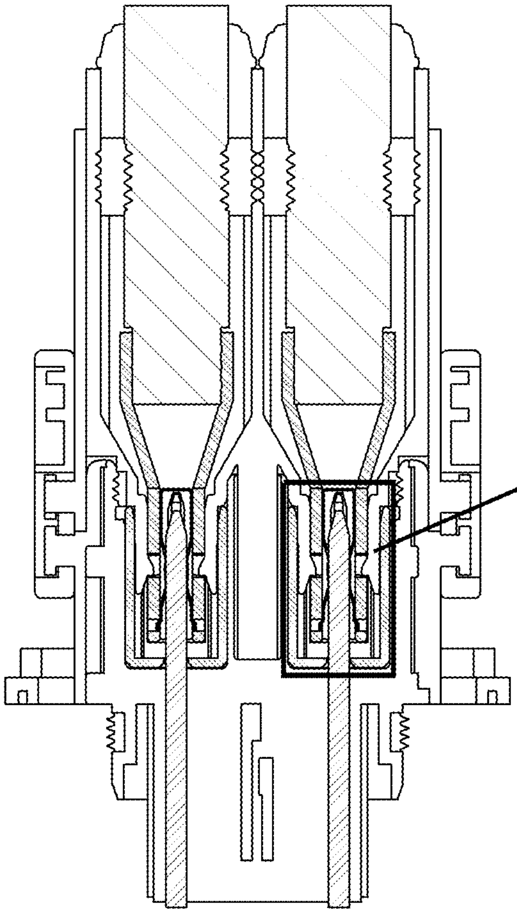
FIG. 14A is an upper and lower cross-sectional view illustrating the connector coupled with a female connector in one embodiment of the present disclosure.
Figure 14B:
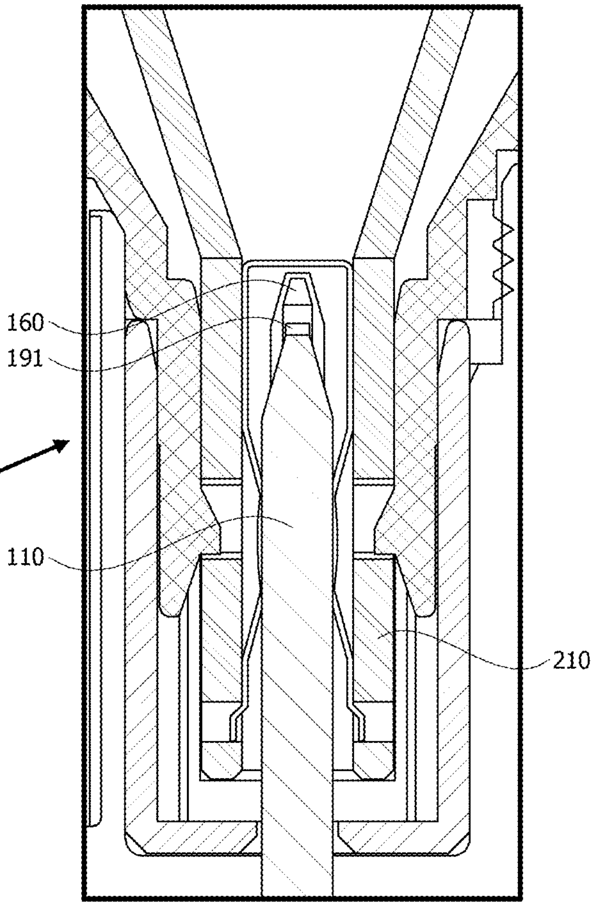
FIG. 14B is an enlarged view of a part identified in FIG. 14A.
Figure 15A:
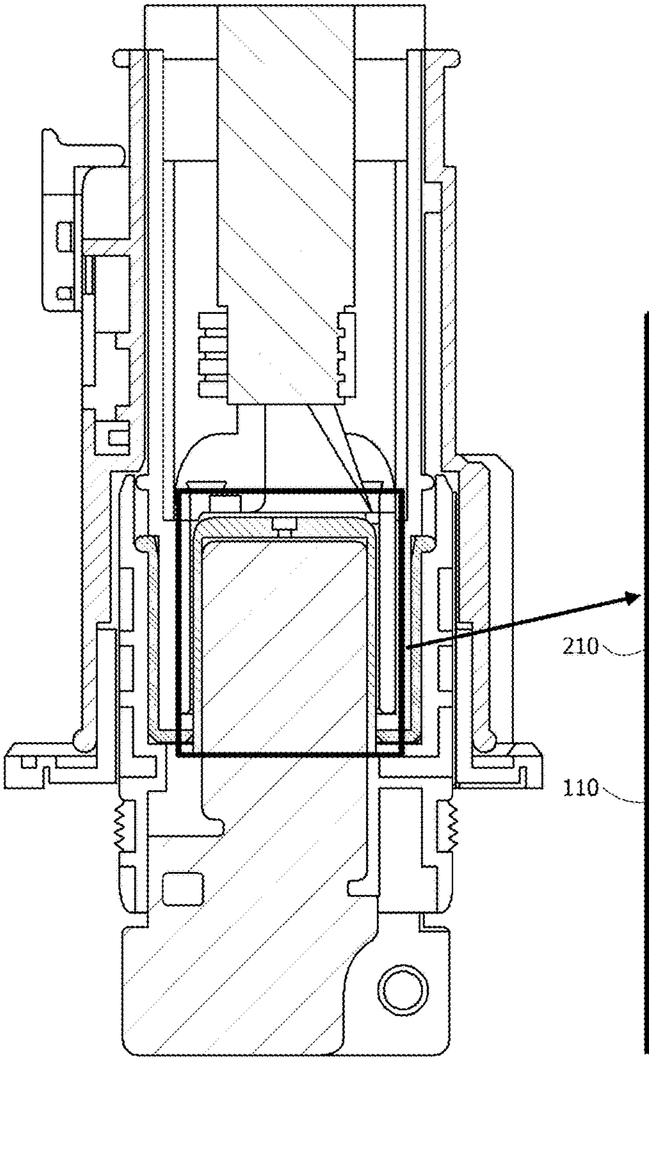
FIG. 15A is a side cross-sectional view illustrating the connector coupled with the female connector in one embodiment of the present disclosure.
Figure 15B:
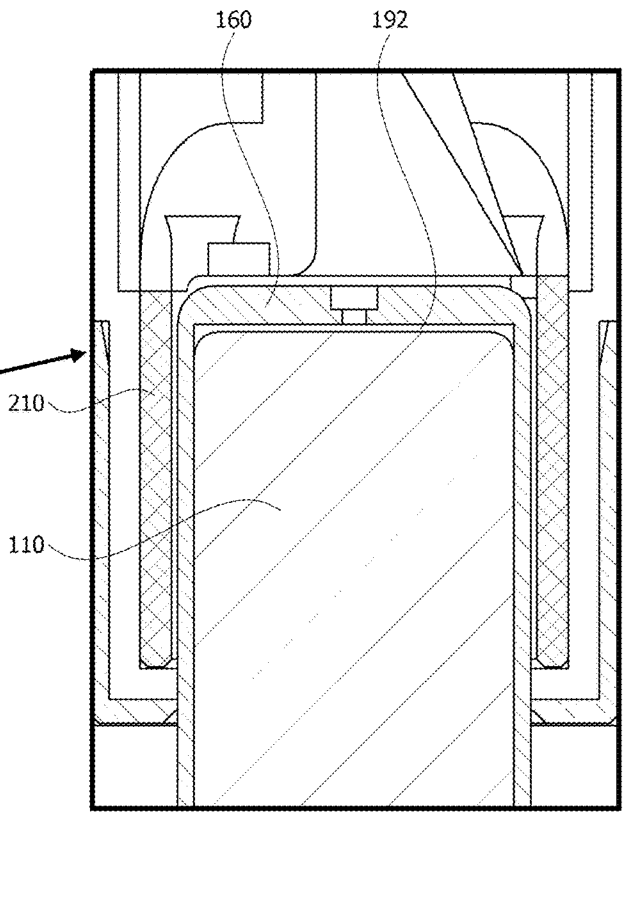
FIG. 15B is an enlarged view of a part identified in FIG. 15A.

FIG. 14A is an upper and lower cross-sectional view illustrating the connector coupled with a female connector, and FIG. 14B is an enlarged view of a part identified in FIG. 14A. FIG. 15A is a side cross-sectional view illustrating the connector coupled with the female connector, and FIG. 15B is an enlarged view of a part identified in FIG. 15A.

The connector 100 of the disclosure is a male connector in which the terminal 110 has a shape protruding to the outside, and the female connector 200 has a terminal 110 provided therein, whereby the terminal 110 of the male connector 100 is assembled by being inserted into the inside of the female connector 200.

Referring to FIGS. 14A, 14B, 15A and 15B, the front surface of the terminal 110 is covered by the first cover 161, and thus the front surface of the terminal 110 may not directly come into contact with the terminal 210 of the female connector 200. Also, the upper and lower surfaces of the terminal 110 is covered by the second cover 162, and thus the upper and lower surfaces of the terminal 110 may not directly come into contact with the terminal 210 of the female connector 200.

Therefore, the side surface of the terminal 110 of the connector 100 comes into contact with the terminal 210 of the female connector 200 whereby both the connectors may be coupled.

As is apparent from the above, according to a high voltage male connector and a high voltage connector according to an embodiment, by satisfying the IPXXB standard without adding components, the cost and weight of the high voltage connector can be reduced and the structure can be simplified.

The embodiments disclosed with reference to the accompanying drawings have been described above. It should be understood by those having ordinary skill in the art that various changes in form and details may be made therein without departing from the spirit and scope of the present disclosure. The disclosed embodiments are illustrative and should not be construed as limiting.

What is claimed is:

1. A connector comprising:

an outer housing having a tube shape;

an inner housing coupled to the outer housing, wherein the inner housing comprises: a rear wall, and a terminal cover configured to extend from the rear wall in a longitudinal direction of the outer housing; and a terminal in a plate shape and configured to be seated on and coupled to the terminal cover, wherein the terminal cover is configured to cover edges of the terminal and to expose a side surface of the terminal, wherein the terminal cover comprises:

a first cover configured to cover a front surface of the terminal; and a second cover configured to cover upper and lower surfaces of the terminal, and wherein a hole is formed in a center of the first cover of the terminal cover so that whether the terminal is assembled with the terminal cover is checked.

2. The connector according to claim 1, wherein when the terminal is coupled to the terminal cover, the edges of the terminal and the first and second covers of the terminal cover have a structure of being engaged with each other.

3. The connector according to claim 2, further comprising:

a lance, wherein when the terminal is coupled to the inner housing, the lance is coupled to a hole formed on one side of the terminal.

4. The connector according to claim 3, further comprising a Terminal Position Assurance (TPA), wherein when the terminal is coupled to the inner housing, the terminal is fixed by the TPA.

5. The connector according to claim 4, wherein the TPA comprises a protrusion and a groove, and the protrusion is released to separate the TPA when a force is applied to the groove of the TPA.

6. The connector according to claim 5, further comprising a protective rib, wherein the protective rib covers a portion of the side surface of the terminal.

7. The connector according to claim 1, wherein when the terminal is coupled to the terminal cover, the front surface of the terminal and the first cover of the terminal cover have a structure of being engaged with each other.

8. The connector according to claim 1, wherein when the terminal is coupled to the terminal cover, the upper and lower surfaces of the terminal and the second cover of the terminal cover have a structure of being engaged with each other.

* * * * *